Sept. 27, 1932.   F. R. BERGSTEN   1,879,043
COW TAIL HOLDER
Filed Nov. 25, 1931
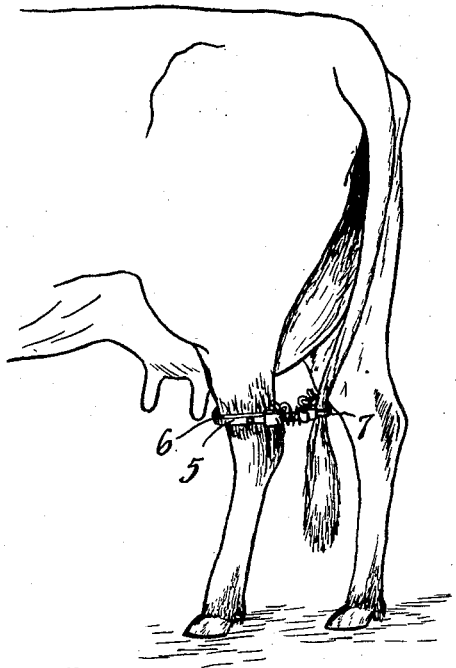
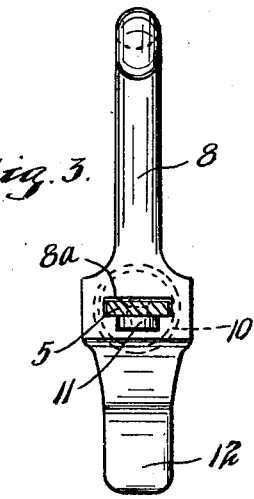
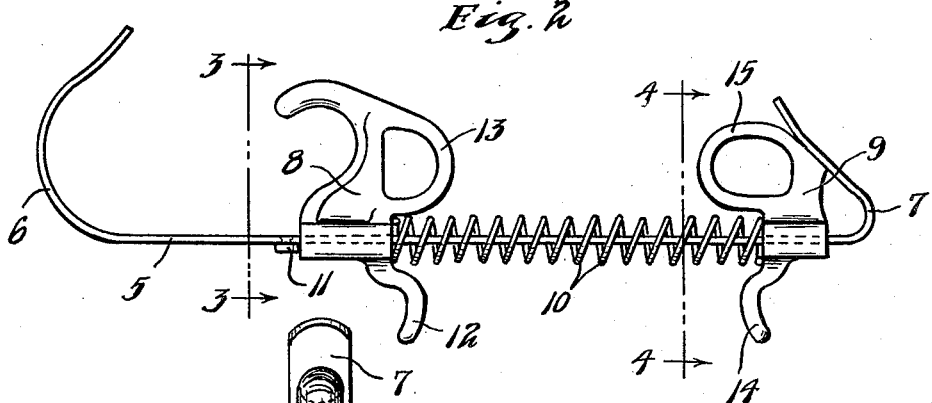
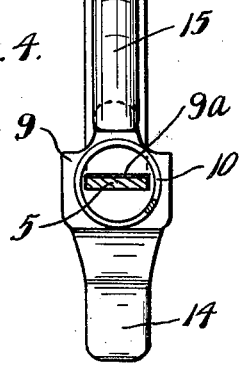
INVENTOR.
FRANK R. BERGSTEN.
BY HIS ATTORNEYS.
Williamson & Williamson Patented Sept. 27, 1932

1,879,043

UNITED STATES PATENT OFFICE

FRANK R. BERGSTEN, OF ANOKA, MINNESOTA

COW-TAIL HOLDER

Application filed November 25, 1931. Serial No. 577,196.

My invention relates to a cow tail holder for the purpose of preventing switching of the cow's tail, while the milking operation is being performed.

During the time when a cow is being milked, switching of the cow's tail may cause considerable annoyance to the person doing the milking and also may be the cause of dirt getting into the milk pail. Cords and straps have been used for securing the tail of a cow, but are difficult to apply, often slip off and soil the milker's hands. Complicated mechanical devices have been used prior to this time, but for the most part have been found objectionable in that they cause discomfort to the animal, are expensive to manufacture and are difficult to apply.

It is an object of my invention to provide a simple and rugged device which can be quickly and conveniently placed in operative position to efficiently secure a cow's tail to the leg of the cow.

It is a further object to provide a device of the above described class in which the use of the device will not require that the milker's hands come in contact with the cow's leg or tail.

It is a still further object of my invention to provide a device of the above described class which can be easily washed or sterilized.

Another object is to provide a device of the above described class which will cause the cow no pain or annoyance.

These and other objects and advantages of the invention will be more fully set forth in the following description made in connection with the accompanying drawing, in which like reference characters refer to similar parts throughout the several views, and in which:—

Fig. 1 is a perspective view showing the device operatively applied;

Fig. 2 is a plan view of the device;

Fig. 3 is a sectional view taken along the line 3—3 looking in the direction of the arrows;

And Fig. 4 is a sectional view taken along the line 4—4 looking in the direction of the arrows.

In the embodiment of my invention illustrated a substantially rigid bar 5 of rectangular preferably oblong cross section is provided, usually constructed from heavy metal stripping. Bar 5 is straight throughout the greater portion of its length and has its ends bent or otherwise shaped into curved or hook shaped portions 6 and 7 respectively. It will be noted that the hook portion 6 is arcuately curved throughout most of its length and is considerably larger than the V-shaped hook portion 7 at the right end of the device as it appears in Fig. 2. A pair of jaw members 8 and 9 cooperate with hook portions 6 and 7 respectively and are slidably mounted on the medial and straight portion of the bar 5, said jaw members having thickened attachment portions or bases provided with longitudinally disposed oblong shaped apertures which snugly accommodate bar 5. A helical compression spring 10 surrounds bar 5 and extends between jaw members 8 and 9 applying outward pressure equally to both of said jaw members. A stop 11 is rigidly affixed to the straight portion of bar 5 spaced some distance from the larger hook end 6 and limiting the outward position of jaw 8 and also causing some compression at all times to be placed upon coil spring 10. Jaw member 8 is provided with a thumb grip 12 which projects laterally from the slide or attachment portion of the jaw and a ring 13 preferably integrally formed with jaw 8 projects from the opposite side of the bar. The side or edge of jaw member 8 facing toward the large hook portion 6 is shaped or curved to conform to the rear portion and tendon of a cow's leg above the knee joint.

Jaw member 9 is provided with a projecting finger grip 14 disposed on the same side of bar 5 as thumb grip 12 and with a ring 15 corresponding to the ring 13 of jaw member 8. The side of jaw member 9 opposed to the smaller hook portion 7 is preferably slightly curved to cooperate with hook portion 7 to comfortably yet positively clamp the cow's tail.

Obviously coil spring 10 normally forces jaw member 8 to its limit of movement against stop 11 and also urges jaw member 9 against the outer end of hook portion 7.

To operatively apply the device the tail is first preferably gripped, by retracting jaw 9, engaging the tail in the hook 7 and releasing the jaw. This is accomplished without touching the tail of the animal. The device is then clamped to the leg by retracting jaw 8, engaging the lower end of the thigh of the animal with the hook 6 and releasing jaw 8 against the rear of the leg and tendon.

The above attachment of the device may be most conveniently accomplished by gripping jaw 8 only by means of the thumb piece 12 and simultaneously gripping jaw 9 with the two fore fingers through ring 15 and grip 14. The jaws are then urged together but due to the rotative force applied to jaw 8 because of the grip from one side thereof only, jaw 8 will bind against the bar 5 and only the jaw 9 will be retracted. The tail is quickly engaged in the hook 7 and jaw 9 released positively gripping the tail. The procedure is reversed for clamping the device to the leg of the cow, jaw 9 being gripped preferably from the thumb piece 14 alone, while jaw 8 is gripped by the two fore fingers of the hand and when the jaws are urged together, jaw 8 only will be retracted. Hook 6 is then slipped around the lower portion of the thigh of the leg and the jaw 8 released. The shape of hook portion 6 and the opposing side or edge of jaw 8 conform very closely to the normal shape of the portion of the cow's leg engaged and the device causes no discomfort to either the tail or leg of the animal though the clamping means are positive in nature and cannot be shaken loose.

From the foregoing description it will be seen that I have provided an extremely simple, highly efficient tail holder for cows and other domestic animals, which can be manufactured at very low cost, which can be conveniently and quickly attached in operative position without soiling the hands of the milkers and which will successfully hold the tail to prevent dirt or germs from getting into the milk and to prevent the cow from switching the tail to the annoyance of the milker.

It will, of course, be understood that various changes may be made in the form, details, proportions and arrangement of the parts, without departing from the scope of my invention, which, generally stated, consists in a device capable of carrying out the objects above set forth and in the novel parts and combinations of parts disclosed and defined in the appended claims.

What is claimed is:—

1. A holder of the class described comprising a bar, a clamping abutment at each end of said bar, a pair of clamping members slidably connected with said bar and means interposed between said clamping members for urging the same outwardly to cooperate with the respective abutments.

2. A holder of the class described comprising a bar, a clamping abutment at each end of said bar, a pair of clamping members slidably connected with said bar, means interposed between said clamping members for urging the same outwardly to cooperate with the respective abutments, said clamping members being normally spaced apart a distance within the span of the average human hand and finger grips carried by said clamping members for retracting the same.

3. A tail holder comprising a bar, each end of which is formed into a hook shaped clamping abutment, a pair of clamping members slidably mounted on said bar, one being shaped to cooperate with one of said clamping abutments for grasping a leg of an animal and the other being shaped to cooperate with the second clamping abutment to grasp the tail of the animal and means interposed between said clamping members for urging the same outwardly.

4. A tail holder comprising a bar, the greater part of which is straight, a clamping abutment at each end of said bar, a pair of clamping members slidably mounted on said bar and a coil compression spring surrounding the medial portion of said bar and interposed between said clamping members for urging the same outwardly to cooperate with said abutments.

5. A tail holder comprising a bar, the greater portion of which is straight, a clamping abutment fixed to each end of said bar, a pair of clamping members slidably mounted on said bar, one being shaped to cooperate with one of said abutments for grasping a leg of an animal and the other being shaped to cooperate with the second abutment to grasp the tail of the animal, a coil compression spring mounted on the intermediate portion of said bar and interposed between said clamping members and a stop for limiting the outward sliding movement of said leg grasping clamping member to space the same from its cooperating abutment.

6. A holder of the class described comprising a bar, the greater portion of which is straight, a clamping abutment at each end of said bar, a pair of clamping members having attachment portions snugly surrounding said bar and slidably and non-rotatably mounted thereon, means interposed between said clamping members for urging the same outwardly to cooperate with said abutments, said clamping members each having a pair of finger grips disposed on opposite sides of said bar, corresponding finger grips of said two clamping members being substantially aligned whereby either of said clamping members may be retracted alone by spanning said clamping members with the hand and engaging both of said finger grips of the clamping member to be moved but only one of the finger grips of the other clamping member.

7. A tail holder comprising an integral bar of rectangular cross section having its ends formed into hooks, a pair of jaw members having attachment portions snugly surrounding said bar and slidably mounted thereon, a coil compression spring surrounding the medial portion of said bar for urging said clamping members outwardly to cooperate with said abutments, said clamping members each having a pair of finger grips disposed on opposite sides of said bar, corresponding finger grips of said two clamping members being substantially aligned whereby either of said clamping members may be retracted alone by spanning said clamping members with the hand and engaging both of said finger grips of the clamping member to be moved but only one of the finger grips of the other clamping member.

In testimony whereof I affix my signature.

FRANK R. BERGSTEN.